No. 758,832. PATENTED MAY 3, 1904.
M. FORST.
TWINE CUTTER.
APPLICATION FILED JAN. 20, 1904.
NO MODEL.
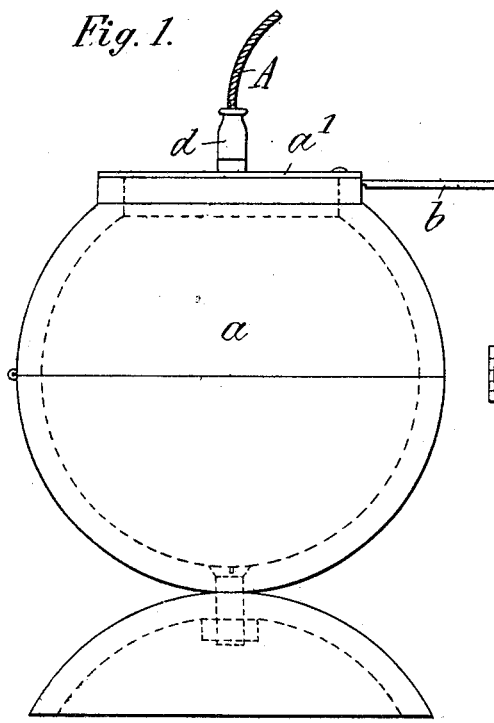
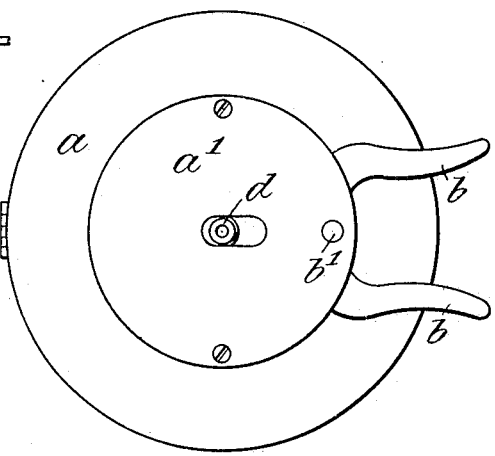
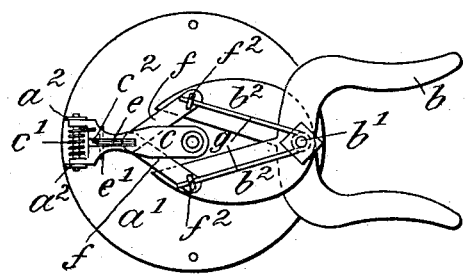
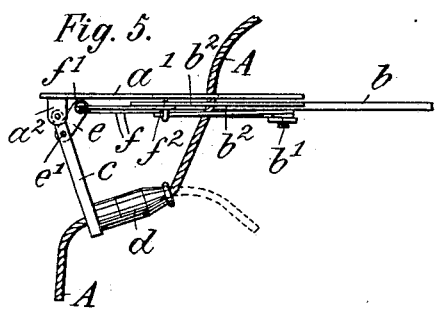
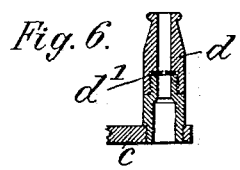
Witnesses:
Arthur Junge
William Spherly
Inventor:
Moritz Forst
by Frank H. Briere Atty No. 758,832. Patented May 3, 1904.

UNITED STATES PATENT OFFICE.

MORITZ FORST, OF NEW YORK, N. Y.

TWINE-CUTTER.

SPECIFICATION forming part of Letters Patent No. 758,832, dated May 3, 1904.

Application filed January 20, 1904. Serial No. 189,807. (No model.)

*To all whom it may concern:*

Be it known that I, MORITZ FORST, a citizen of Austria-Hungary, residing at New York city, Manhattan, county and State of New York, have invented new and useful Improvements in Twine-Cutters, of which the following is a specification.

This invention relates to a twine-cutter which is so constructed that the twine is severed at a distance from the delivering-nozzle. In this way a section of twine of sufficient length to be conveniently grasped by the operator will protrude from the nozzle after each cutting operation.

In the accompanying drawings, Figure 1 is a side view of my improved twine-cutter; Fig. 2, a plan thereof; Fig. 3, a bottom view of the cutter, showing the shears open; Fig. 4, a similar view with the shears closed; Fig. 5, a side view of the cutter, and Fig. 6 a detail longitudinal section through the twine-guide.

The letter $a$ represents a holder having a slotted top plate $a'$ and adapted to receive a ball of twine. To the lower side of plate $a'$ are fulcrumed at $b'$ a pair of shears $b\ b$, having cutting-blades $b^2$. Opposite to pivot $b'$ there depend from the plate $a'$ a pair of lugs $a^2$, which constitute the bearings of an oscillating lever $c$, influenced by a spring $c'$, which tends to normally throw the lever upward. The free end of lever $c$ is perforated and provided with a tubular twine guide or nozzle $d$, which plays between the shear-blades $b^2$ and is adapted to be projected out of holder $a$ through the slot of plate $a'$. I prefer to make the thread-guide sectional and insert between the sections thereof a slotted elastic washer $d'$, Fig. 6, by means of which the twine is held to the guide by frictional contact. The lever $c$ is slotted at $c^2$ to receive one end of a link $e$, which is pivoted thereto at $e'$. The other end of link $e$ is pivotally connected at $f'$ to a pair of diverging links $f$, pivoted, respectively, to the free ends of the two shear-blades $b^2$ at $f^2$. The links $f$, as well as the shears, are influenced by a spring $g$, mounted on pivot $b'$ and tending to normally open the links and shears.

In use the twine A is passed out of the holder through the guide $d$, which is projected upward between the open blades of the shears, Figs. 1 and 3. When the twine is to be cut, the shears are closed. As the shear-blades approach each other they will, through links $f\ e$, first cause the lever $c$ to be swung downward, so that the thread-guide clears the blades and descends to such a distance that a given length of twine is drawn back into the holder below the shears and above the guide, Figs. 4 and 5. The upper end of this exposed length of twine is then cut by the complete closing of the shear-blades. When the shears are released, they will be opened by the spring $g$, while the lever $c$ will be again thrown up into its normal position by the spring $c'$. As the twine has been cut off at a distance above the nozzle, a sufficient length of twine will thus protrude to be readily grasped by the operator.

What I claim is—

A twine-cutter composed of an oscillating lever, a thread-guide at the free end thereof, a pair of pivoted shear-blades, a pair of diverging links pivoted to the free ends of said blades, and means for connecting said links to the lever, substantially as specified.

Signed by me at New York city, (Manhattan,) New York, this 19th day of January, 1904.

MORITZ FORST.

Witnesses:
 MORRIS H. SIEGEL,
 WILLIAM SCHULZ.